United States Patent [19]
Rice

[11] 3,949,817
[45] Apr. 13, 1976

[54] CHAIN SAW EXTENDER
[76] Inventor: John S. Rice, Rte. 1, Freeman, Mo. 64746
[22] Filed: Dec. 2, 1974
[21] Appl. No.: 528,872

[52] U.S. Cl............. 173/170; 16/111 R; 16/114 R; 30/381; 74/544
[51] Int. Cl.² .......................................... B27B 17/00
[58] Field of Search........ 173/170; 16/114 R, 111 R, 16/110 R, 111 A; 30/381–387; 74/543, 544; 30/DIG. 1, DIG. 5

[56] References Cited
UNITED STATES PATENTS

| | | | |
|---|---|---|---|
| 2,165,904 | 7/1937 | Osgood........................... | 173/170 X |
| 3,130,444 | 4/1964 | Stollsteimer..................... | 16/111 A |
| 3,731,382 | 5/1973 | Wroe................................ | 30/381 |
| 3,823,474 | 7/1974 | Ionescu........................... | 16/111 R |

FOREIGN PATENTS OR APPLICATIONS

| | | | |
|---|---|---|---|
| 38,521 | 7/1957 | Poland.................................. | 30/381 |
| 942,591 | 5/1956 | Germany............................. | 173/170 |
| 931,373 | 8/1955 | Germany............................. | 30/381 |
| 581,672 | 8/1959 | Canada................................. | 30/382 |

*Primary Examiner*—Frank L. Abbott
*Assistant Examiner*—William F. Pate, III
*Attorney, Agent, or Firm*—Fishburn, Gold & Litman

[57] ABSTRACT

Apparatus is disclosed for extending the reach of a portable chain saw for the purpose of cutting tree limbs and branches which would otherwise be inaccessable to the operator of the saw. An elongated post which can be held in the hands is equipped with means for securing a chain saw thereto at the front end. A pivotable lever is also attached to the front end of the post for contacting and depressing the power trigger on the chain saw. A finger operated control trigger is located at the rear end of the post, and means are provided for connecting the pivotable lever and the control trigger so that the lever is pivoted and the power trigger of the saw is thus depressed by the lever when the control trigger is operated.

11 Claims, 4 Drawing Figures

U.S. Patent  April 13, 1976  3,949,817
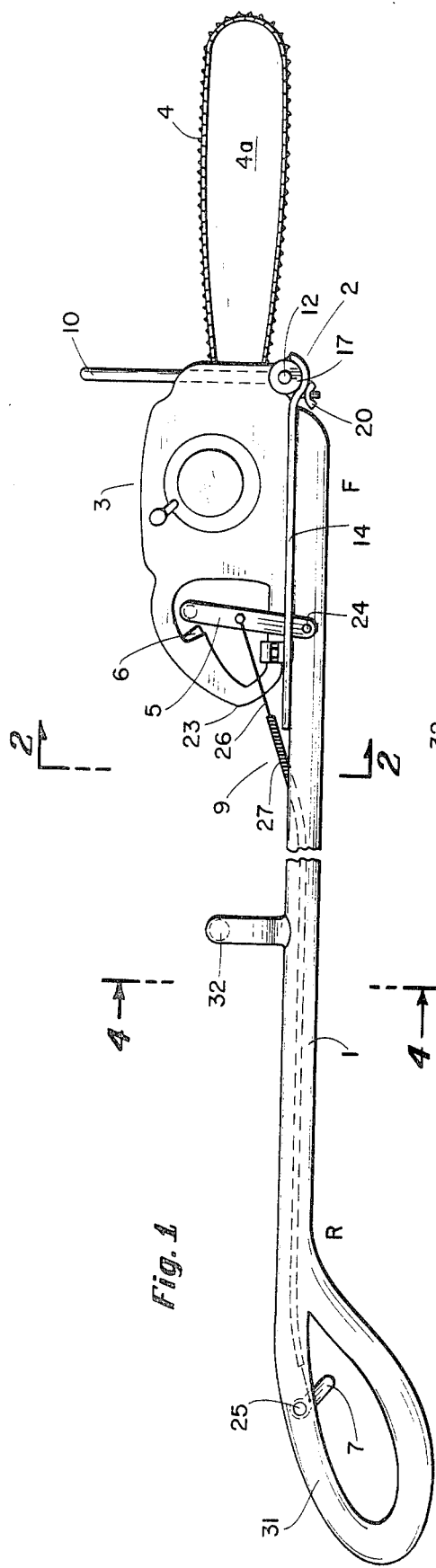
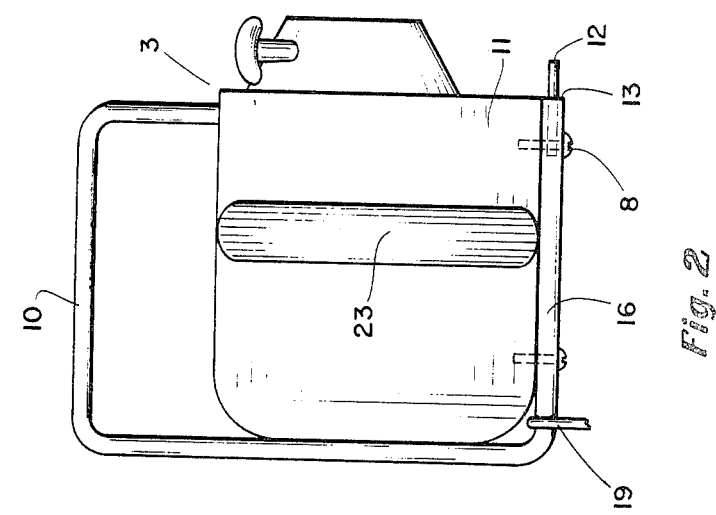
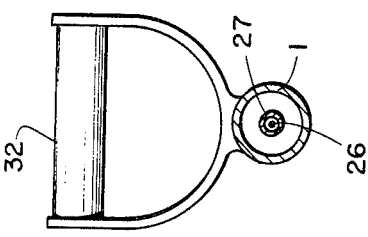
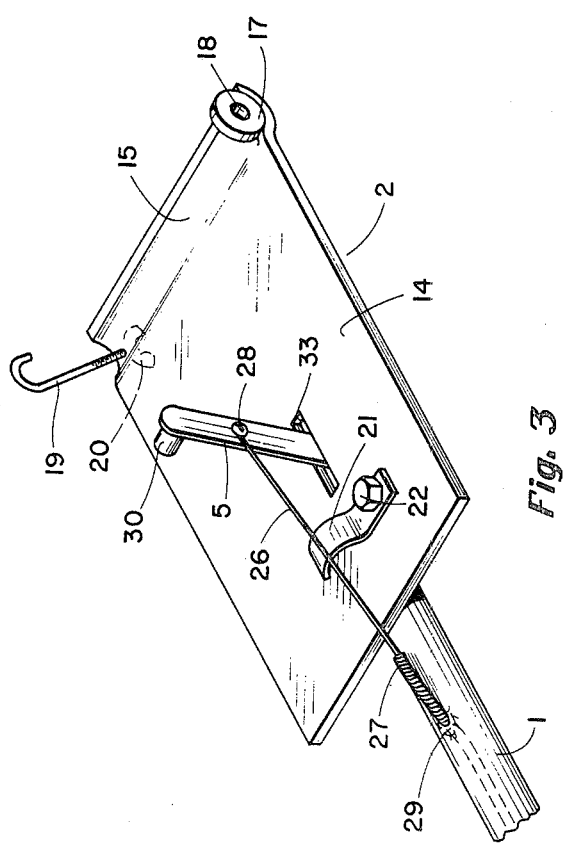

CHAIN SAW EXTENDER

BACKGROUND OF THE INVENTION

This invention pertains to portable chain saws wherein an endless cutting chain is driven around the periphery of a guide bar attached to the motor housing of the saw. More specifically, this invention pertains to elongation of the hand-holding means of a chain saw in order to extend the reach of the saw by the chain saw operator while also permitting him to maintain control over the amount of power being applied to the cutting chain.

Portable chain saws, both gasoline and electric powered, have become well developed and are now extremely popular for the felling, cutting-up and trimming of trees. However, one problem that is frequently encountered during use of these saws is their relatively short overall length. As a consequence, it is not possible for the operator of a chain saw to stand in a particular spot on the ground and reach upward and/or outward to cut a limb several feet beyond his normal reach with the saw, e.g. an operator cannot normally make a cut more than 3–5 feet beyond his arm's reach when holding and operating the saw.

Previous attempts to increase the distance to which an operator can reach and cut tree limbs, etc., with a portable power-driven saw are disclosed by Lagant in U.S. Pat. No. 2,655,957 and by Lawrence in U.S. Pat. No. 2,697,457. Both of these references show use of specially designed sawing apparatus which is quite different from a chain saw. More specifically, each of these patentees shows use of a circular saw blade attached to one end of hand-held mast or pole, and with the circular blade being driven by means of a shaft or flexible cable which leads rearwardly of the operator to a gasoline engine power source located either at the rear end of the hand-held pole or behind it.

A principle object of the present invention is to provide means for increasing the distance to which the operator of a conventional chain saw can reach, when cutting wood, without modifying the basic design of the chain saw being used.

Another object is to provide improved hand-holding means which can be attached to a conventional chain saw for extending the reach of the saw by an operator, and which can be simply attached or detached from the chain saw between cutting operations.

Still another object is accomplishment of the foregoing objects while also providing means whereby the operator of the chain saw can maintain control over the amount of power applied to the cutting chain of the saw.

These and other objects and advantages of the present invention will become apparent from the following description and the appended claims.

SUMMARY OF THE INVENTION

The present invention resides in improved apparatus for hand-holding and controlling a chain saw while extending the distance to which an operator can reach with the saw when cutting wood. The present apparatus comprises an elongated post, e.g. 6 to 7 feet long, which can be held in the hands and which includes means for securing a chain saw to the front end of the post. A pivotal lever is attached to the post toward its front end and a finger operated control trigger is attached to the post rearwardly of the pivotable lever. Means are provided for connecting the pivotable lever and the control trigger so that the lever is pivoted upon depressing the control trigger. The pivotable lever is located and positioned so that when pivoted it applies and releases pressure on a spring-biased power trigger of a chain saw which has been secured to the post. Accordingly, application of power to the cutting chain of the saw can be regulated by the operator by means of the finger operated control trigger.

BRIEF DESCRIPTION OF THE DRAWINGS

FIG. 1 illustrates the apparatus of the present invention along with an attached chain saw.

FIG. 2 is a rear view of the chain saw shown in FIG. 1.

FIG. 3 is an isometric view of one means of attaching a chain saw to the hand-held post.

FIG. 4 is a view along the line 4—4 of the hand-held post shown in FIG. 1.

DESCRIPTION OF PREFERRED EMBODIMENTS

In FIG. 1, an elongated hand-holdable post 1 has means 2 at the front end F for securing a chain saw 3 to the post. Although a gasoline powered chain saw is shown in the drawings, the present invention can also be used with electric powered saws. The chain saw has an endless cutting chain 4 which is power driven around the periphery of a guide bar 4a which extends laterally from the housing 11 of the saw. As shown in the drawings, the chain saw is mounted on post 1 so that the guide bar 4a and the attached blade 4 project forwardly from the post in alignment with the longitudinal axis of the post. The particular advantage associated with such an arrangement will be described later on.

A lever 5, for activation of the power trigger 6 of the chain saw, is located toward the front end F of post 1 and is pivoted at the lower end. A finger operated control trigger 7 is located toward the rear end R of the post. Connecting means 9 interconnects the pivotable lever 5 and the control trigger 7 so that the lever 5 pivots and contacts and depresses the power trigger 6 on the saw when the control trigger 7 at the rear of post 1 is depressed by a finger of the operator.

In FIG. 2, a tubular front handle 10 extends around the engine or motor housing 11 of the chain saw. An extension 12, which can be a piece of shaft stock, projects outward from an open tube end 13 of the front handle 10 and is held in place by a bolt 8 which also normally fastens handle 10 to the housing 11 of the saw.

One means for securing a chain saw to the front end of the post 1 can be readily visualized by reference to FIG. 3. Platform 14 is rigidly attached to post 1 and receives the engine or motor housing 11 of the chain saw. The front end of the platform comprises a transversely extending cradle 15 which accommodates the lower portion 16 of the handle 10 on the underside of the housing 11. A ring 17, having a central opening 18 is affixed to one end of the cradle. The straight shaft of a hook 19 extends through an opening in the platform toward the other end of the cradle. The straight shaft of the hook is threaded to receive a wing nut 20 on the lower side of the platform. A clip 21 is attached to the upper rear end of the platform by means of a nut and bolt 22. Attachment of the chain saw to the platform 14 is accomplished by (1) inserting extension 12 of the front handle 10 in the central opening of ring 17, (2) latching hook 19 over the lower portion 16 of the front handle 10 (See FIG. 2) and tightening wing nut 20 to clamp the front end of the saw to the platform, and (3) clamping the rear handle of the chain saw to the platform by means of clip 21.

The lever 5 for actuating the power trigger 6 of the chain saw is pivotally attached to the front end F of the hand-held post 1 by means of a pivot post 24. In a similar fashion, the trigger 7, at the rear end of the post 1, is pivotally attached thereto by means of a rod 25 which passes through the trigger.

As illustrated in FIGS. 1, 3 and 4, the connecting means 9 for interconnecting lever 5 and control trigger 7 comprises a flexible wire or cable 26 contained within a flexible metal jacket 27, and the cable is free to move back and forth therein. The forward end of the cable 26 is attached to lever 5 by means of a nut and bolt 28 whereas the other end of the cable is likewise attached to the trigger 7 by means of a nut and bolt which are not shown. The forward end of the cable jacket is secured to the front end of post 1 by means of brazing, represented at 29, to prevent back and forth movement of the jacket while providing support for the cable. Where preferrable and practical, the jacket 27 can be dispensed with, or means other than a wire or cable can be used for interconnecting the lever 5 and the trigger 7.

It will be understood that means other than the platform and clamps as are shown in FIGS. 1-3 can be used for securing the chain saw to post 1. For instance, front and rear brackets can be mounted on the post for receiving the housing of the saw and the saw could be fastened to the post by means of removable clamps or straps.

As represented in FIGS. 1, 3 and 4, the hand-holdable post 1 is tubular for the purpose of reducing weight while also providing a housing for the shielded cable over most of its length. It should be understood, however, that the hand-holdable post could also be made of a lightweight solid material and that the jacketed cable or equivalent connecting means could run along the outside of the post.

As shown in the drawings, neither the trigger 7 nor the lever 5 is provided with a spring to effect lifting of the lever 5 off of the power trigger 6 when the control trigger 7 is released after being depressed to apply power to the saw. This is because the power trigger of the chain saw is biased with a spring which is usually powerful enough to pivot lever 5 when the control trigger is released. Otherwise, either the lever 5 or the trigger 7 can be provided with a return spring or else the trigger 7 can be manipulated back and forth between two fingers of the hand without the aid of springs.

Referring again to FIG. 3, an optional power-trigger engagement pin 30 is shown on the upper end of lever 5. Use of such a pin simplifies lateral alignment of the lever 5 with the power trigger 6. Also as shown in FIG. 3, the lever 5 is shown to extend outwardly from the platform while being arranged to pivot back and forth, in slot 33, in relation to the longitudinal axis of the post 1. This is because the usual location of the power trigger on a chain saw is on the upper inside of the rear handle. It will therefore be appreciated that the lever 5 can be given other suitable location and orientations when adapting the present apparatus for use with chain saws having power triggers in a different location.

It will also be understood that the hand-holdable post 1 can be a substantially straight section of tubing or shafting without any separately definable gripping means such as a handle. However, the apparatus is made more managable by inclusion of one or more hand grips such as is illustrated in FIG. 1. The rear end R of post 1 can, for instance, be provided with a piston-grip handle 31 from which the control trigger 7 protrudes in order to provide a more natural and restful grip while also permitting easier manipulation of the trigger. A handle can also be attached to the post 1 between the front and rear ends thereof. As shown in FIGS. 1 and 4 such a handle 32 can, to advantage, extend transversally in relation to the post 1. For maximum ease of handling and manuvering a chain saw, both of such handles can be used.

As can be seen from the drawings, a chain saw can be easily attached or detached from the hand-holdable post between sawing operations. When mounted on the post, gasoline powered saws can be started in the usual manner while holding the saw in the hands by the rear handle 23 of the saw.

Operation of a chain saw mounted on a post with handles as shown is in almost all respects more manageable than in the absence thereof. The assembly takes on the form of a lance or other hand-held weapon whereby the operator can deftly guide the cutting chain of the saw to precise locations in attacking limbs or branches which are eight or nine feet or even further away, whether overhead in a tree or on or near the ground in a pile of brush. It will also be appreciated that operation of a chain saw while using the present invention can be somewhat safer and more comfortable since it moves the saw further from the operator while also reducing the opportunity of his getting into awkward positions as could result in falling.

Finally, it should be pointed out that hand-holdable posts having a length of about 6 to 8 feet have been found quite manageable, when using the present apparatus, especially with chain saws weighing about 7 to 12 pounds.

While the present invention has been described with reference to particular apparatus, combinations thereof, methods of operating, and the like, it will nonetheless be understood that even other embodiments will become apparent which are within the spirit and scope of the invention defined in the following claims.

What is claimed and desired to secure by Letters Patent is:

1. The combination of a chain saw and an apparatus for hand-holding and controlling same while extending the reach of the saw comprising:
   a. a post which can be held in the hands and which includes means at the front of said post to which end said chain saw is secured;
   b. saw actuating means comprising a pivotal lever attached to said post toward the front end thereof;
   c. a control trigger attached to said post rearwardly of said actuating means;
   d. a flexible cable operably connecting said actuating means and said control trigger;
   e. a chain saw cutting chain projecting forwardly of said post in orientation with the longitudinal axis thereof; and
   f. a chain saw power trigger selectively engaged by said actuating means whereby depression of said control trigger depresses said power trigger.

2. The combination of a chain saw and an apparatus for handholding and controlling same while extending the reach of the saw comprising:
   a. a post which can be held in the hands and which includes means at the front end of said post to which said chain saw is secured;
   b. saw actuating means associated with said post toward the front end thereof;
   c. a control trigger attached to said post rearwardly of said actuating means;
   d. a flexible line having one end attached to said actuating means and the other end of said line attached to said control trigger;
   e. a chain saw cutting chain projecting forwardly of said post in orientation with the longitudinal axis thereof; and
   f. a chain saw power trigger selectively engaged by said actuating means whereby depression of said control trigger depresses said power trigger.

3. An apparatus for holding, controlling and extending the reach of a chain saw, said saw including a cutting chain, a selfcontained motor, a motor housing, a pistol grip handle with a power trigger and a grasping bar, and said apparatus comprising:
   a. a post including first and second ends; said second end being adapted for human grasping;
   b. means for removably attached said chain saw to said post first end, said cutting chain being disposed forwardly of said first end, said last named means comprising:
      1. a platform attached to said post at the first end thereof, adapted for receiving said motor housing thereon;
      2. means disposed at a forward portion of said platform for releasably clamping a lower lateral portion of said grasping bar to said platform;
      3. means for releasably clamping a rearward portion of said motor housing to a rearward portion of said platform;
   c. mechanical actuating means disposed adjacent said first end; a portion of said actuating means adapted for engagingly manipulating said power trigger, for controlling said motor;
   d. control means attached to said post rearwardly of said actuating means for remotely operating said actuating means; and
   e. a flexible line having one end attached to said control means and the other end attached to said actuating means such that manipulation of said control means controls said chain saw motor through displacement of said actuating means and power trigger.

4. Apparatus as set forth in claim 3 wherein:
   a. said platform includes a transverse channel in a forward portion thereof adapted for seating a lower surface of the grasping bar lateral portion therein; and
   b. said clamping means at the forward portion of the platform releasably and securely clamps the grasping bar seatingly in said channel.

5. Apparatus as set forth in claim 3 wherein:
   a. said post second end has a pistol grip handle; and
   b. said control means includes a control trigger protruding from said pistol grip handle.

6. Apparatus as set forth in claim 3 wherein:
   a. said mechanical actuating means includes a lever having one end pivotally attached to the post, and the other end adapted for engagement with the chain saw power trigger; and
   b. said flexible line has one end thereof pivotally attached to said lever at a point spaced apart from the pivotally attached end of the lever.

7. Apparatus as set forth in claim 6 wherein:
   a. a said control means includes a control trigger protruding from said post; and
   b. the other end of the flexible line is attached to said trigger such that displacement of said trigger causes displacement of said lever.

8. Apparatus as set forth in claim 7 wherein:
   a. said post is hollow; and
   b. said flexible line extends through the inside of the post.

9. Apparatus as set forth in claim 8 wherein:
   a. said lever extends through an aperture in said platform and outwardly therefrom, being adapted to pivot back and forth longitudinally of the longitudinal axis of said post.

10. Apparatus as set forth in claim 3 including a handle attached to said post between the front and rear ends thereof.

11. Apparatus as set forth in claim 10 wherein said handle includes a gripping portion which extends transversely in relation to the post.

* * * * *